United States Patent
Goswami et al.

(10) Patent No.: US 11,962,784 B2
(45) Date of Patent: Apr. 16, 2024

(54) INTRA PREDICTION

(71) Applicant: Ofinno, LLC, Reston, VA (US)

(72) Inventors: Kalyan Goswami, Reston, VA (US); Esmael Hejazi Dinan, McLean, VA (US); Tae Meon Bae, McLean, VA (US)

(73) Assignee: Ofinno, LLC, Reston, VA (US)

( * ) Notice: Subject to any disclaimer, the term of this patent is extended or adjusted under 35 U.S.C. 154(b) by 7 days.

(21) Appl. No.: 17/483,089

(22) Filed: Sep. 23, 2021

(65) Prior Publication Data

US 2022/0094945 A1 Mar. 24, 2022

Related U.S. Application Data

(60) Provisional application No. 63/082,174, filed on Sep. 23, 2020.

(51) Int. Cl.
*H04N 19/159* (2014.01)
*H04N 19/176* (2014.01)
*H04N 19/96* (2014.01)

(52) U.S. Cl.
CPC ......... *H04N 19/159* (2014.11); *H04N 19/176* (2014.11); *H04N 19/96* (2014.11)

(58) Field of Classification Search
None
See application file for complete search history.

(56) References Cited

U.S. PATENT DOCUMENTS

| | | |
|---|---|---|
| 9,277,227 B2 | 3/2016 | Lu et al. |
| 9,693,054 B2 | 6/2017 | Jeon et al. |
| 10,817,989 B2 * | 10/2020 | Kim ............... H04N 21/234363 |
| 2011/0243225 A1 | 10/2011 | Min et al. |
| 2012/0082223 A1 * | 4/2012 | Karczewicz ......... H04N 19/196 375/E7.243 |
| 2017/0041616 A1 | 2/2017 | Ramamurthy et al. |
| 2017/0280157 A1 | 9/2017 | Jeon et al. |
| 2020/0382793 A1 * | 12/2020 | Gao ..................... H04N 19/176 |
| 2021/0211643 A1 * | 7/2021 | Da Silva Pratas Gabriel ............. G06T 3/4046 |

FOREIGN PATENT DOCUMENTS

WO 2015/101329 A1 7/2015

OTHER PUBLICATIONS

T. Nguyen, et al., Reduced-complexity entropy coding of transform coefficient levels using a combination of VLC and PIPE, Input Document, Joint Collaborative Team on Video Coding (JCT-VC) of ITU-T SGI6 WP3 and ISO/IEC JTC1/SC29/WG11 Doc. No. JCTVC-D336 (Jan. 21, 2011) (Year: 2011).*

* cited by examiner

*Primary Examiner* — Lindsay J Uhl
(74) *Attorney, Agent, or Firm* — Willis H. Chang; Kavon Nasabzadeh; Philip R. Smith

(57) ABSTRACT

In some embodiments, a decoder may receive, in a bit stream and for a block of samples, a residual and an indication of a downscaling. The decoder may determine reference samples for intra prediction of the block of samples. The decoder may generate, for an intra prediction mode, a prediction of the block of samples from the reference samples, The decoder may generate a first decoded block of samples based on: the prediction of the block of samples; and the residual. Based on the indication of the downscaling, the decoder may upscale the first decoded block of samples to a second decoded block of samples.

20 Claims, 16 Drawing Sheets

Horizontal Ternary Tree Partition 608

Vertical Ternary Tree Partition 606

Horizontal Binary Tree Partition 604

Vertical Binary Tree Partition 602

INTRA PREDICTION

This application claims the benefit of U.S. Provisional Application No. 63/082,174, filed Sep. 23, 2020, which is hereby incorporated by reference in its entirety.

BRIEF DESCRIPTION OF THE DRAWINGS

Examples of several of the various embodiments of the present disclosure are described herein with reference to the drawings.

DETAILED DESCRIPTION

Figure 1:
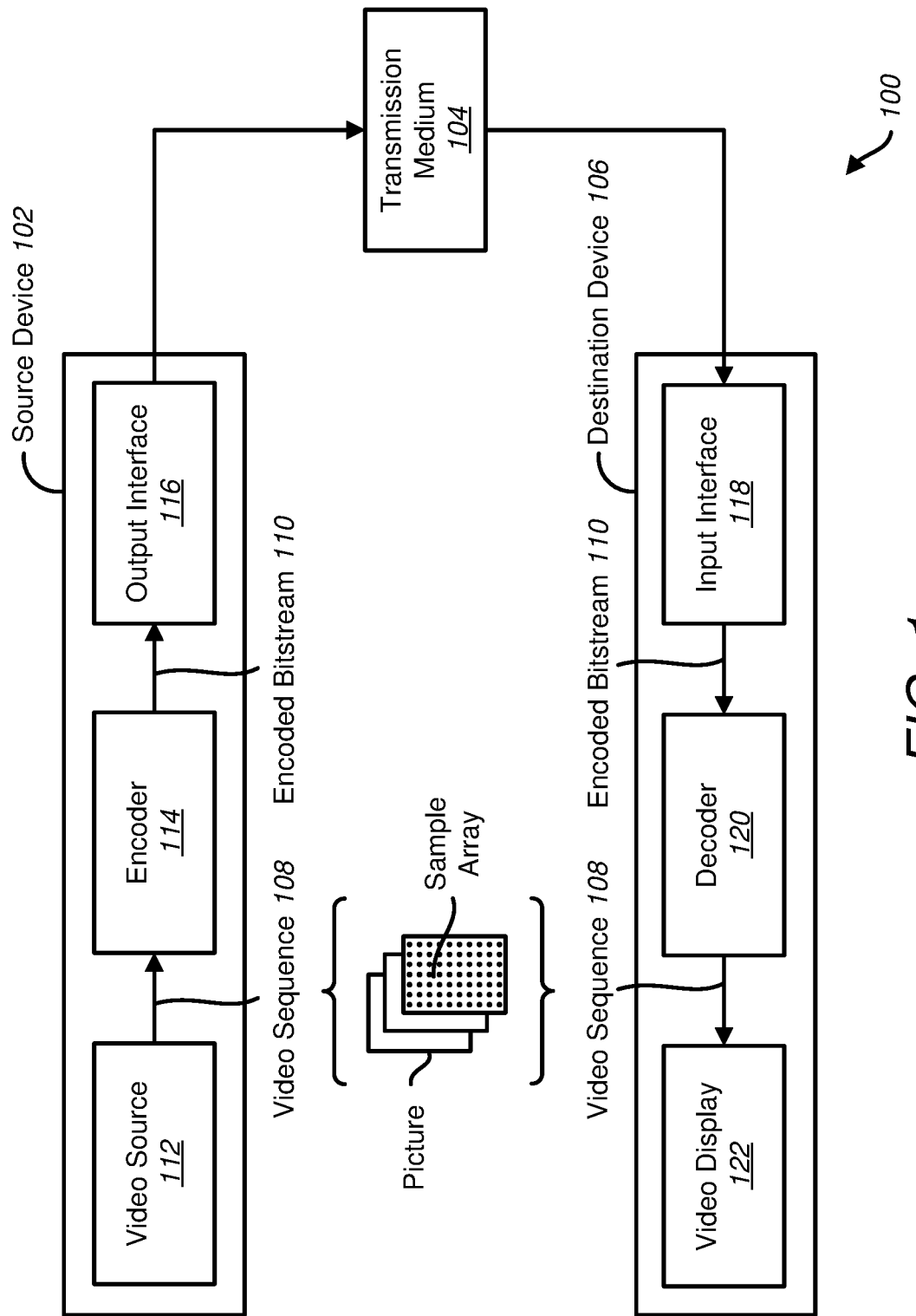
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into an encoded bitstream 110 for more efficient storage and/or transmission. Source device 102 may store and/or transmit encoded bitstream 110 to destination device 106 via transmission medium 104. Destination device 106 decodes encoded bitstream 110 to display video sequence 108. Destination device 106 may receive encoded bit stream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into encoded bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence. A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into encoded bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a prediction block. The prediction error may represent non-redundant information that may be transmitted to a decoder for accurate decoding of a video sequence.

Encoder 114 may apply a transform to the prediction error (e.g. a discrete cosine transform (DCT)) to generate transform coefficients. Encoder 114 may form encoded bitstream 110 based on the transform coefficients and other information used to determine prediction blocks (e.g., prediction types, motion vectors, and prediction modes). In some examples, encoder 114 may perform one or more of quantization and entropy coding of the transform coefficients and/or the other information used to determine prediction blocks before forming encoded bitstream 110 to further reduce the number of bits needed to store and/or transmit video sequence 108.

Output interface 116 may be configured to write and/or store encoded bitstream 110 onto transmission medium 104 for transmission to destination device 106. In addition or alternatively, output interface 116 may be configured to transmit, upload, and/or stream encoded bitstream 110 to destination device 106 via transmission medium 104. Output interface 116 may comprise a wired and/or wireless transmitter configured to transmit, upload, and/or stream encoded bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode encoded bitstream 110 into video sequence 108 for display, destination device 106 may comprise an input interface 118, a decoder 120, and a video display 122. Input interface 118 may be configured to read encoded bitstream 110 stored on transmission medium 104 by source device 102. In addition or alternatively, input interface 118 may be configured to receive, download, and/or stream encoded bitstream 110 from source device 102 via transmission medium 104. Input interface 118 may comprise a wired and/or wireless receiver configured to receive, download, and/or stream encoded bitstream 110 according to one or more proprietary and/or standardized communication protocols, such as those mentioned above.

Decoder 120 may decode video sequence 108 from encoded bit stream 110. To decode video sequence 108, decoder 120 may generate prediction blocks for pictures of video sequence 108 in a similar manner as encoder 114 and determine prediction errors for the blocks. Decoder 120 may generate the prediction blocks using prediction types, prediction modes, and/or motion vectors received in encoded bit stream 110 and determine the prediction errors using transform coefficients also received in encoded bit stream 110. Decoder 120 may determine the prediction errors by weighting transform basis functions using the transform coefficients. Decoder 120 may combine the prediction blocks and prediction errors to decode video sequence 108. In some examples, decoder 120 may decode a video sequence that approximates video sequence 108 due to, for example, lossy compression of video sequence 108 by encoder 114 and/or errors introduced into encoded bit stream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display device 122 may be external to destination device 106 or omitted altogether where video sequence is intended for consumption by a machine and/or storage device. In another example, source device 102 may further comprise a video decoder and destination device 106 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
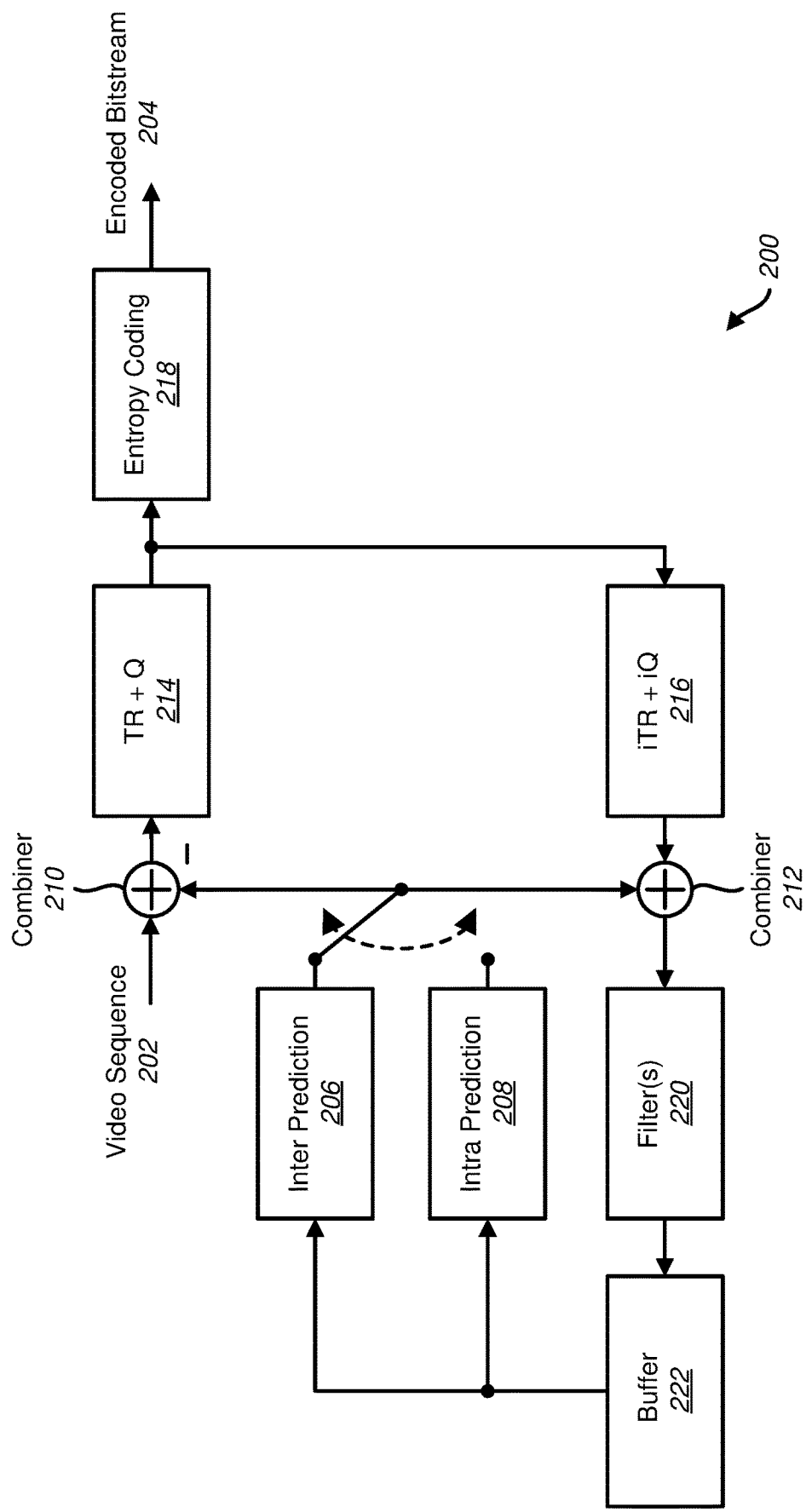
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into an encoded bitstream 204 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the prediction block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in encoded bitstream 204. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form encoded bitstream 204.

Inverse transform and quantization unit 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that encoded bitstream 204 is generated in conformance with the requirements of any one of a number of proprietary or industry video coding standards. For example, The encoder control unit may control the one or more units of encoder 200 such that encoded bitstream 204 is generated in conformance with one or more of ITU-T H.263, AVC, HEVC, VVC, VP8, VP9, and AV1 video coding standards.

Within the constraints of a proprietary or industry video coding standard, the encoder control unit may attempt to minimize or reduce the bitrate of encoded bitstream 204 and maximize or increase the reconstructed video quality. For example, the encoder control unit may attempt to minimize or reduce the bitrate of encoded bitstream 204 given a level that the reconstructed video quality may not fall below, or attempt to maximize or increase the reconstructed video quality given a level that the bit rate of encoded bitstream 204 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form encoded bitstream 204.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
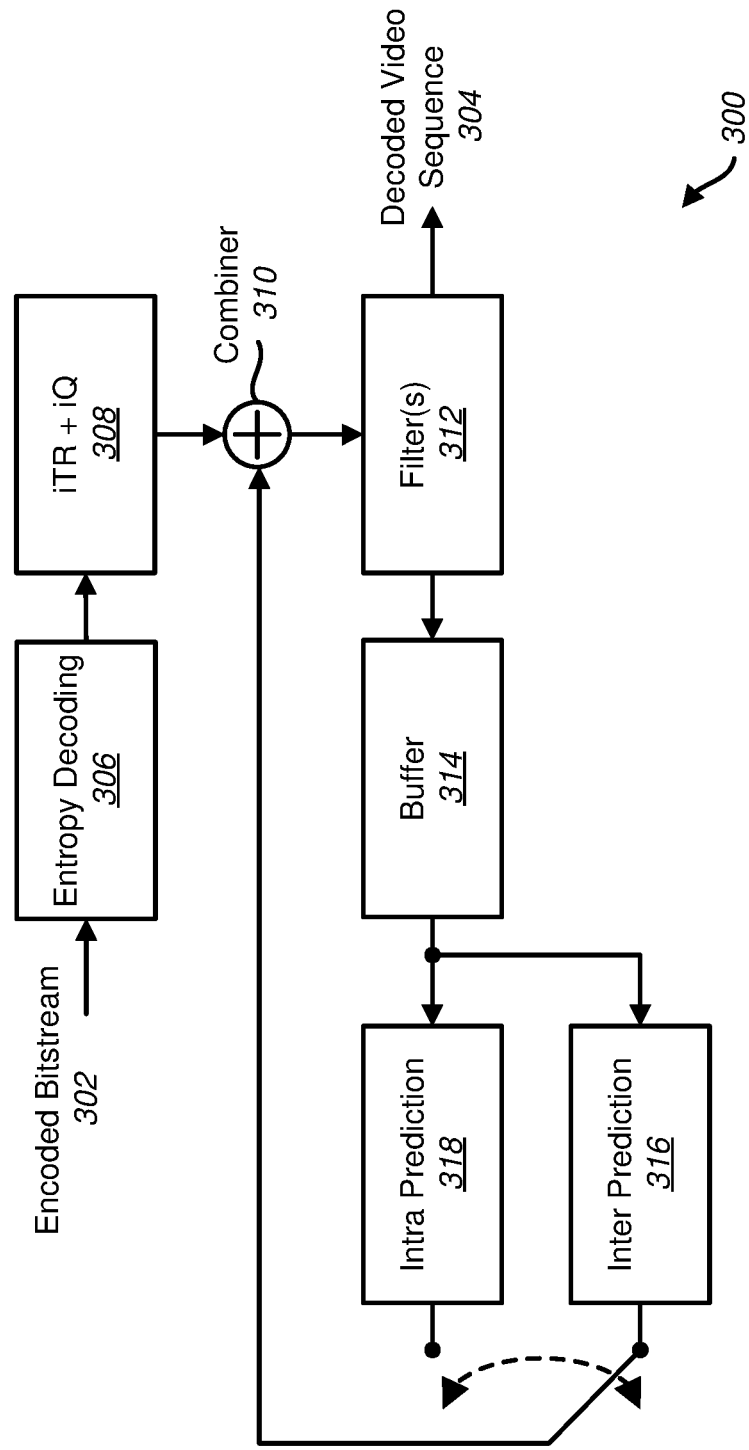
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes an encoded bitstream 302 into a decoded video sequence for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that encoded bitstream 302 is decoded in conformance with the requirements of any one of a number of proprietary or industry video coding standards. For example, The decoder control unit may control the one or more units of decoder 300 such that encoded bitstream 302 is decoded in conformance with one or more of ITU-T H.263, AVC, HEVC, VVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in encoded bitstream 302.

Entropy decoding unit 306 may entropy decode the encoded bitstream 302. Inverse transform and quantization unit 308 may inverse quantize and inverse transform the quantized transform coefficients to determine a decoded prediction error. Combiner 310 may combine the decoded prediction error with a prediction block to form a decoded block. The prediction block may be generated by inter prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in encoded bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block partitions may be used in areas of a picture with higher levels of homogeneity to improve coding efficiency.

In HEVC, a picture may be partitioned into non-overlapping square blocks, referred to as coding tree blocks (CTBs), comprising samples of a sample array. A CTB may have a size of $2^n \times 2^n$ samples, where n may be specified by a parameter of the encoding system. For example, n may be 4, 5, or 6. A CTB may be further partitioned by a recursive quadtree partitioning into coding blocks (CBs) of half vertical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more prediction blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may determine an applied transform size.

Figure 4:
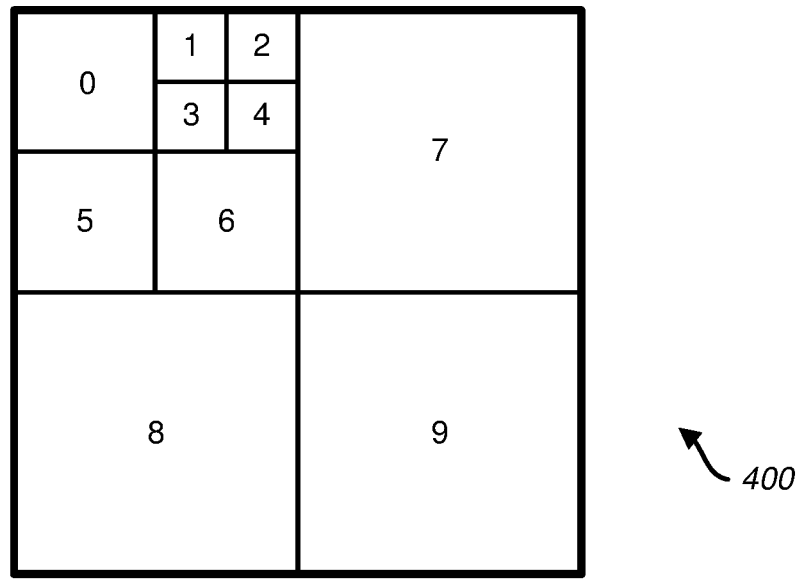
FIG. 4 illustrates an example quadtree partitioning of a coding tree block (CTB) in accordance with embodiments of the present disclosure.
Figure 5:
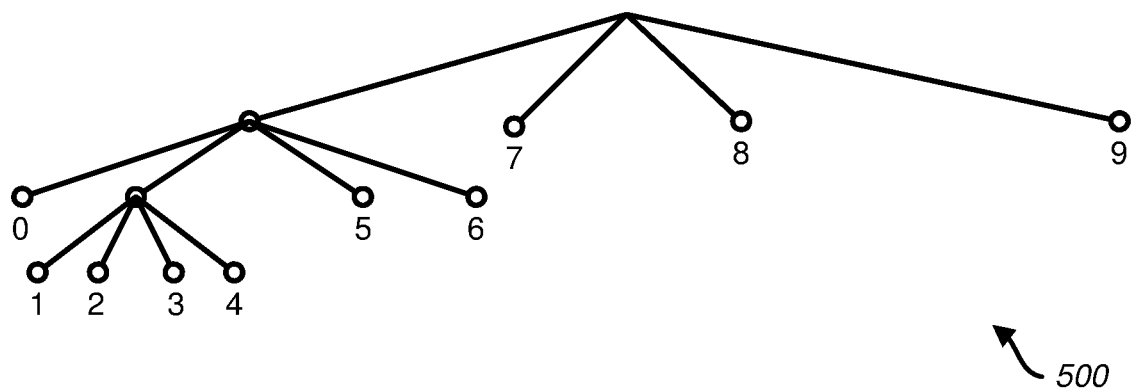
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

Figure 6:
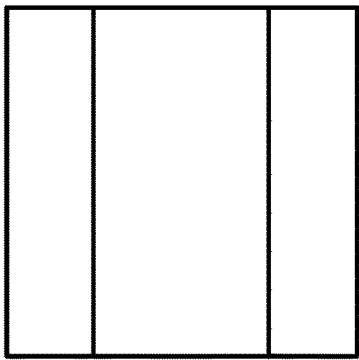
FIG. 6 illustrates example binary and ternary tree partitions in accordance with embodiments of the present disclosure.
Figure 6:
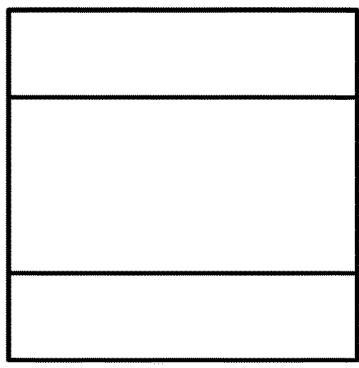
Figure 6:
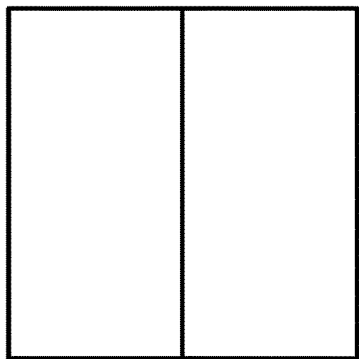
Figure 6:
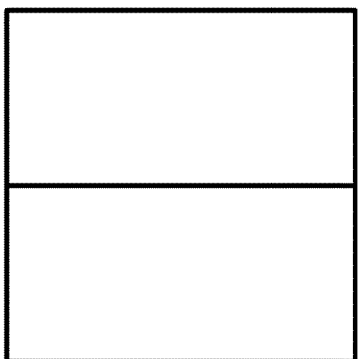

In VVC, a picture may be partitioned in a similar manner as in HEVC. A picture may be first partitioned into non-overlapping square CTBs. The CTBs may then be partitioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The resulting partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
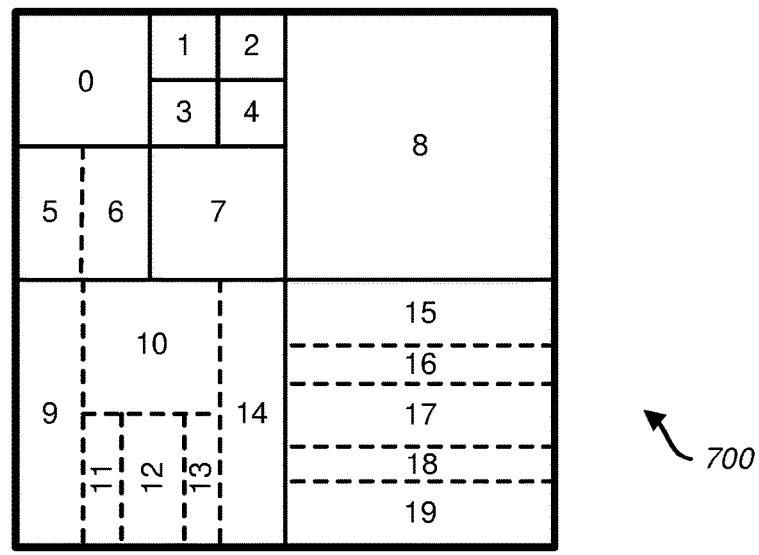
FIG. 7 illustrates an example quadtree+multi-type tree partitioning of a CTB in accordance with embodiments of the present disclosure.
Figure 8:
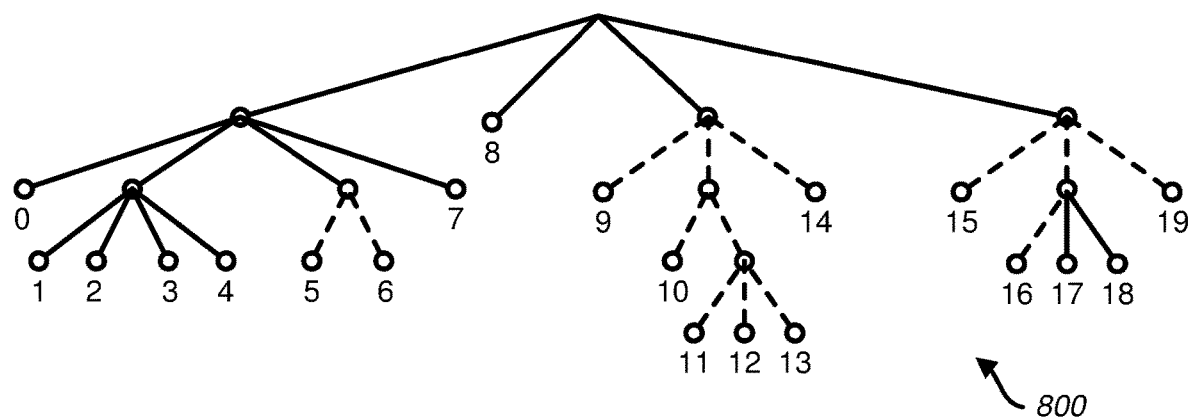
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree partitioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respectively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

It should be noted that the term block may be used to refer to any of a CTB, CB, PB, TB, CTU, CU, PU, or TU in the context of HEVC and VVC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

In intra prediction, samples of a block to be encoded (also referred to as the current block) may be predicted from samples of the column immediately adjacent to the left-most column of the current block and samples of the row immediately adjacent to the top-most row of the current block. The samples from the immediately adjacent column and row may be jointly referred to as reference samples. Each sample of the current block may be predicted by projecting the position of the sample in the current block in a given direction (also referred to as an intra prediction mode) to a point along the reference samples. The sample may be predicted by interpolating between the two closest reference samples of the projection point if the projection does not fall directly on a reference sample. A prediction error (also referred to as a residual) may be determined for the current block based on differences between the predicted sample values and the original sample values of the current block.

At an encoder, this process of predicting samples and determining a prediction error based on a difference between the predicted samples and original samples may be performed for a plurality of different intra prediction modes, including non-directional intra prediction modes. The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block using the intra prediction mode indicated by the encoder and combining the predicted samples with the prediction error.

Figure 9:
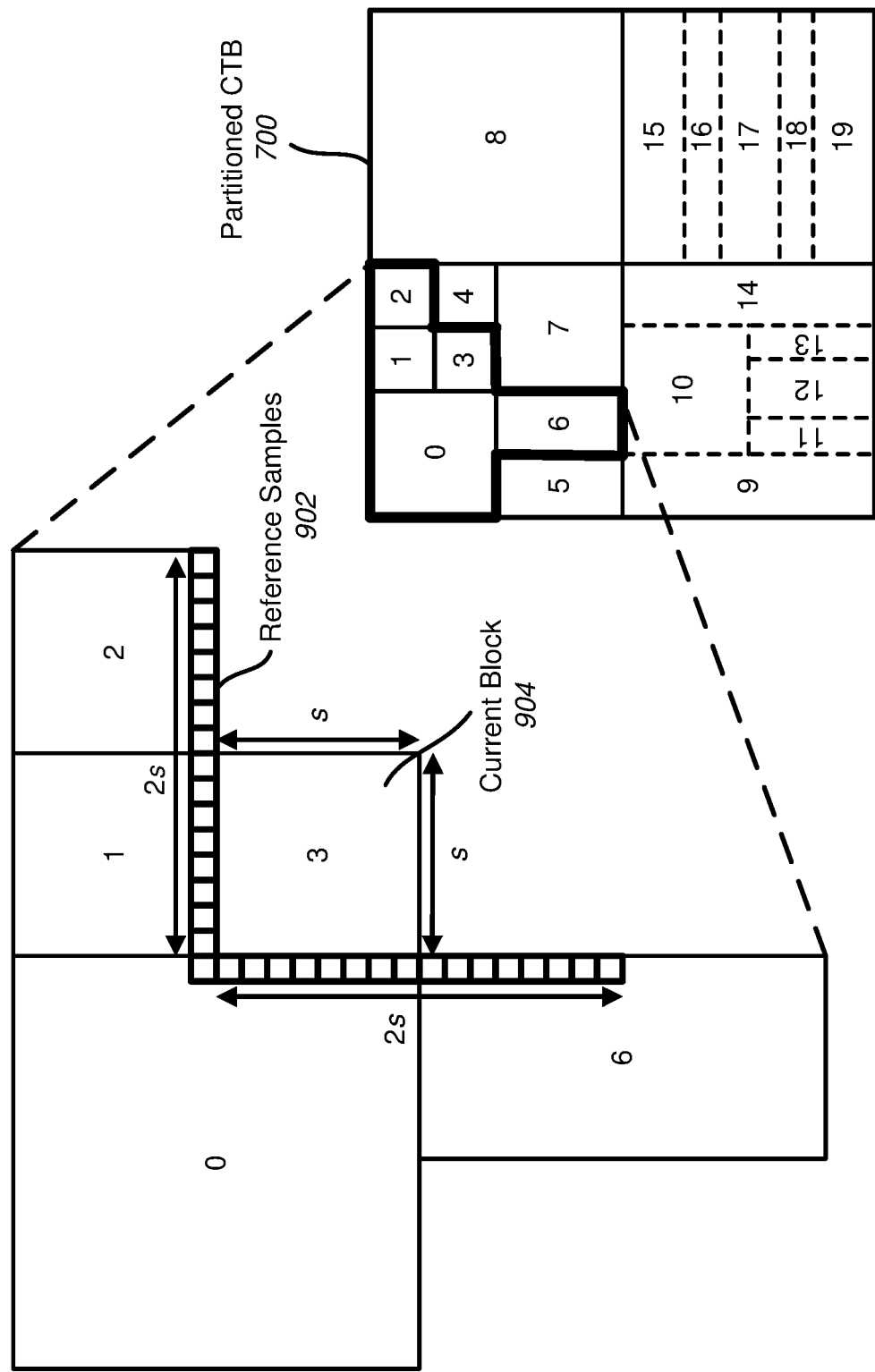
FIG. 9 illustrates an example set of reference samples determined for intra prediction of a current block being encoded or decoded in accordance with embodiments of the present disclosure.

FIG. 9 illustrates an example set of reference samples 902 determined for intra prediction of a current block 904 being encoded or decoded. In FIG. 9, current block 904 corresponds to block 3 of partitioned CTB 700 in FIG. 7. As explained above, the numeric labels 0-19 of the blocks of partitioned CTB 700 may correspond to the sequence order for encoding/decoding the blocks and are used as such in the example of FIG. 9.

Given current block 904 is of w×h samples in size, reference samples 902 may extend over 2 w samples of the row immediately adjacent to the top-most row of current block 904, 2 h samples of the column immediately adjacent to the left-most column of current block 904, and the top left neighboring corner sample to current block 904. In the example of FIG. 9, current block 904 is square, so w=h=s. For constructing the set of reference samples 902, available samples from neighboring blocks of current block 904 may be used. Samples may not be available for constructing the set of reference samples 902 if, for example, the samples would lie outside the picture of the current block, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks.

In addition to the above, samples that may not be available for constructing the set of reference samples 902 include samples in blocks that have not already been encoded and reconstructed at an encoder or decoded at a decoder based on the sequence order for encoding/decoding. This restriction may allow identical prediction results to be determined at both the encoder and decoder. In FIG. 9, samples from neighboring blocks 0, 1, and 2 may be available to construct reference samples 902 given that these blocks are encoded and reconstructed at an encoder and decoded at a decoder prior to coding of current block 904. This assumes there are no other issues, such as those mentioned above, preventing the availability of samples from neighboring blocks 0, 1, and 2. However, the portion of reference samples 902 from neighboring block 6 may not be available due to the sequence order for encoding/decoding.

Unavailable ones of reference samples 902 may be filled with available ones of reference samples 902. For example, an unavailable reference sample may be filled with a nearest available reference sample determined by moving in a clock-wise direction through reference samples 902 from the position of the unavailable reference. If no reference samples are available, reference samples 902 may be filled with the mid-value of the dynamic range of the picture being coded.

It should be noted that reference samples 902 may be filtered based on the size of current block 904 being coded and an applied intra prediction mode. It should be further noted that FIG. 9 illustrates only one exemplary determination of reference samples for intra prediction of a block. In some proprietary and industry video coding standards, reference samples may be determined in a different manner than discussed above. For example, multiple reference lines may be used in other instances, such as used in VVC.

After reference samples 902 are determined and optionally filtered, samples of current block 904 may be intra predicted based on reference samples 902. Most encoders/decoders support a plurality of intra prediction modes in accordance with one or more video coding standards. For example, HEVC supports 35 intra prediction modes, including a planar mode, a DC mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture.

Figure 10A:
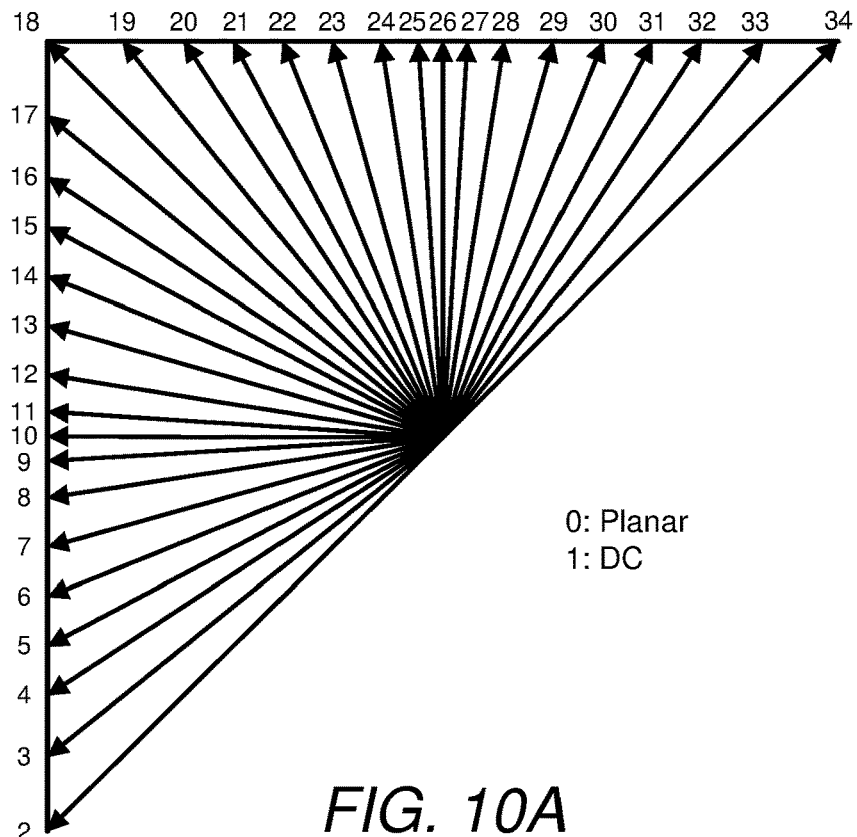
FIG. 10A illustrates the 35 intra prediction modes supported by HEVC in accordance with embodiments of the present disclosure.

FIG. 10A illustrates the 35 intra prediction modes supported by HEVC. The 35 intra prediction modes are identified by indices 0 to 34. Prediction mode 0 corresponds to planar mode. Prediction mode 1 corresponds to DC mode. Prediction modes 2-34 correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

Figure 10B:
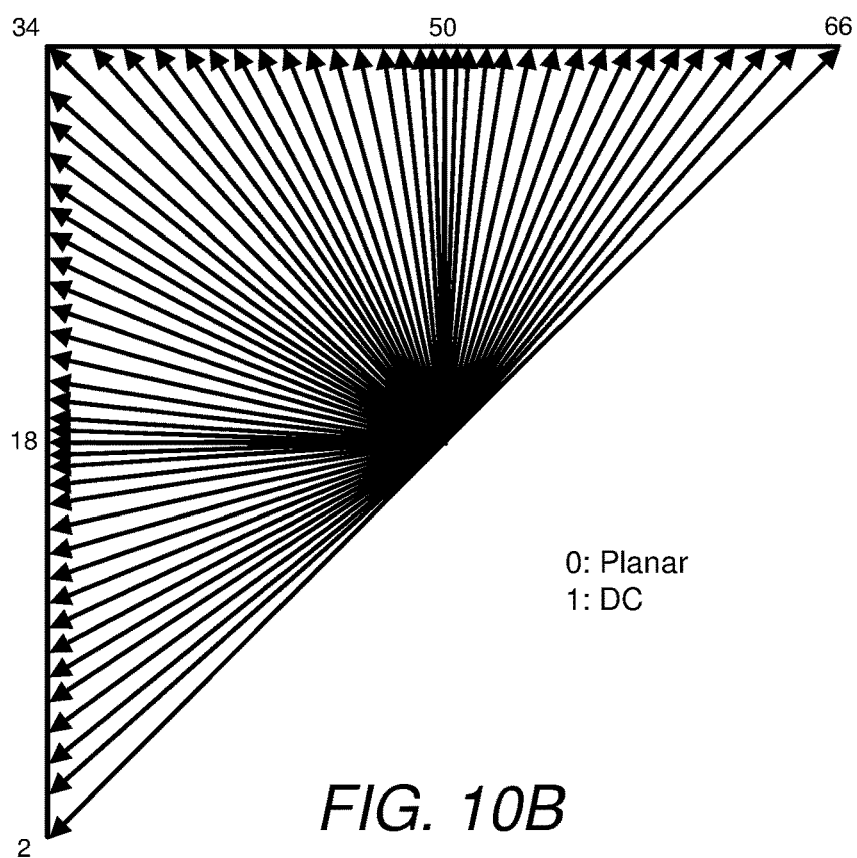
FIG. 10B illustrates the 67 intra prediction modes supported by HEVC in accordance with embodiments of the present disclosure.

FIG. 10B illustrates the 67 intra prediction modes supported by HEVC. The 67 intra prediction modes are identified by indices 0 to 66. Prediction mode 0 corresponds to planar mode. Prediction mode 1 corresponds to DC mode. Prediction modes 2-66 correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Because blocks in VVC may be non-square, some of the intra prediction modes illustrated in FIG. 10B may be adaptively replaced by wide-angle directions.

Figure 11:
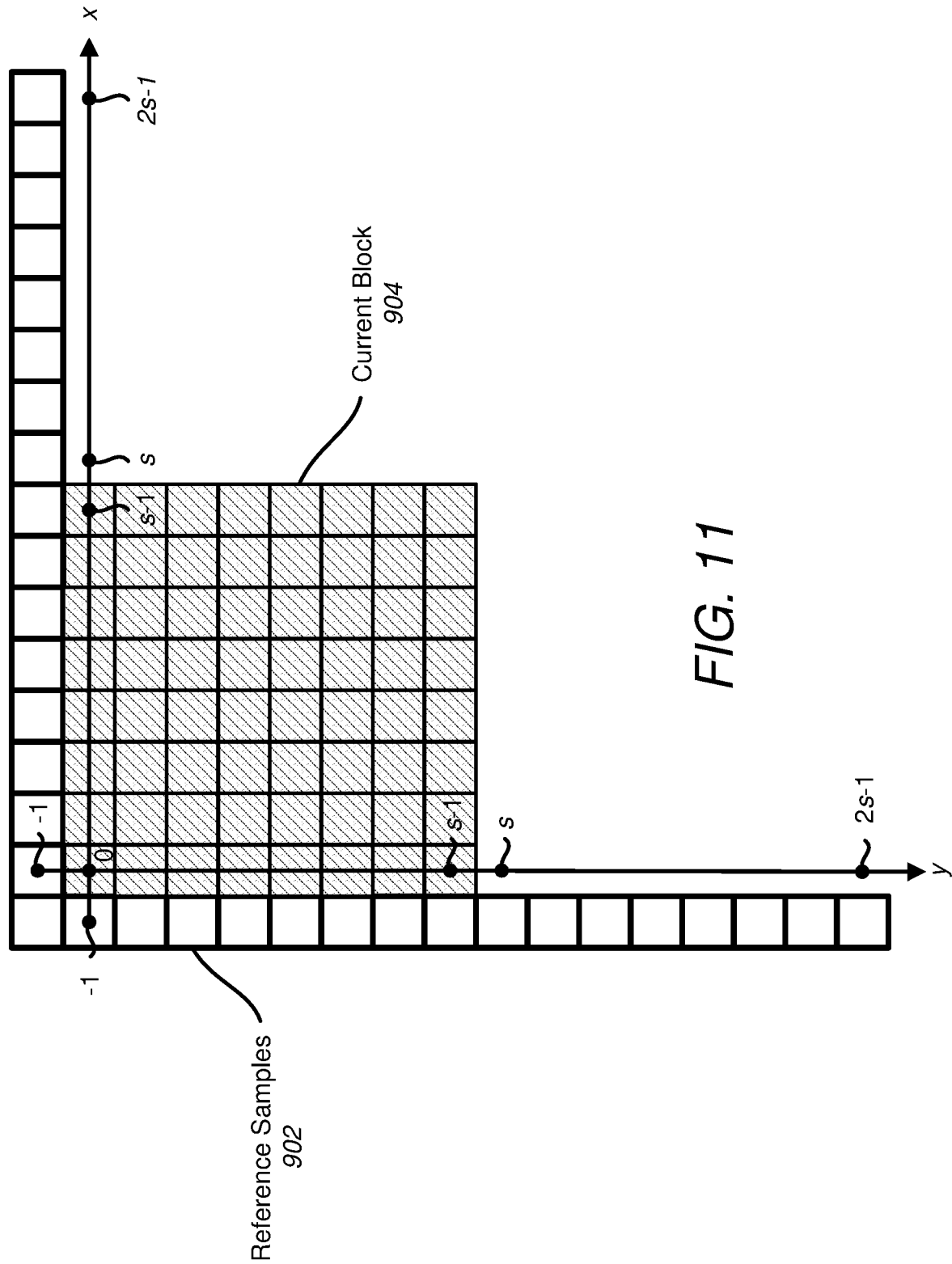
FIG. 11 illustrates the current block and reference samples from FIG. 9 in a two-dimensional x, y plane in accordance with embodiments of the present disclosure.
Figure 12:
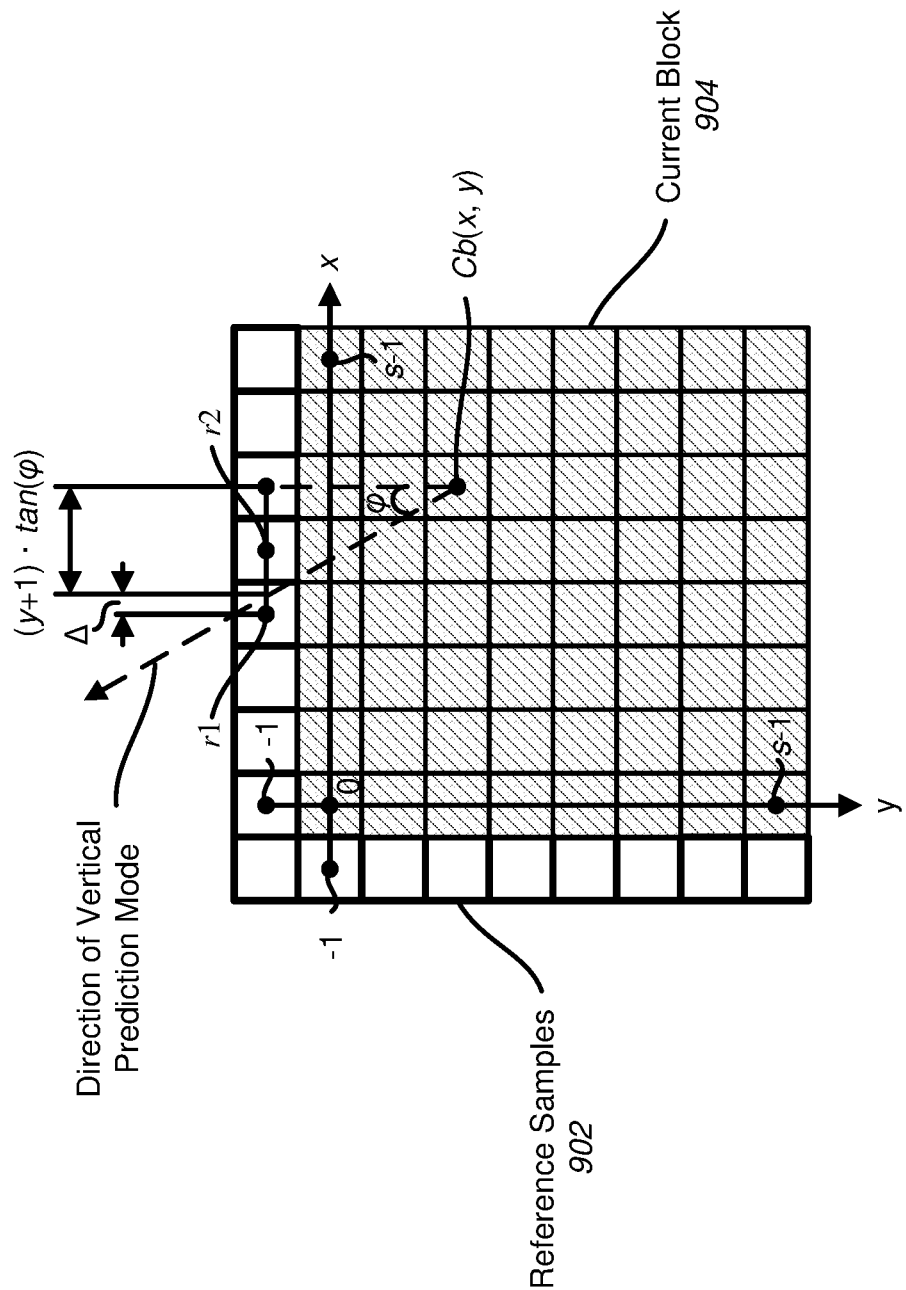
FIG. 12 illustrates an example angular mode prediction of the current block from FIG. 9 in accordance with embodiments of the present disclosure.

To further describe the application of intra prediction modes to determine a prediction of a current block, reference is made to FIGS. 11 and 12. In FIG. 11, current block 904 and reference samples 902 from FIG. 9 are shown in a two-dimensional x, y plane. Current block 904 is referred to as Cb, where Cb(x, y) denotes the predicted value of current block 904 at the coordinates (x, y). Reference samples 902 are referred to as r, where r(x, y) denotes the reference sample of reference samples 902 at the coordinates (x, y).

For planar mode, a sample in Cb may be predicted by calculating the mean of two interpolated values. The first of the two interpolated values may be based on a horizontal linear interpolation of the predicted sample in Cb. The second of the two interpolated values may be based on a vertical linear interpolation of the predicted sample in Cb. The predicted value of the sample in Cb may be calculated as $$Cb(x, y) = \frac{1}{2 \cdot s}(h(x, y) + v(x, y) + s) \quad (1)$$

where $$h(x,y) = (s-x-1) \cdot r(-1,y) + (x+1) \cdot r(s,-1) \quad (2)$$

may be the horizontal linear interpolation of the predicted sample in Cb and $$v(x,y) = (s-y-1) \cdot r(x,-1) + (y+1) \cdot r(-1,s) \quad (3)$$

may be the vertical linear interpolation of the predicted sample in Cb.

For DC mode, a sample in Cb may be predicted by the mean of the reference samples. The predicted value of the sample in Cb may be calculated as $$Cb(x, y) = \frac{1}{2 \cdot s} \cdot \left( \sum_{x=0}^{s-1} r(x,-1) + \sum_{y=0}^{s-1} r(-1,y) \right) \quad (4)$$

A boundary filter may be applied to boundary samples in Cb to smooth the transition between the boundary samples and their respective adjacent neighboring reference sample(s) in r.

For angular modes, a sample in Cb may be predicted by projecting the position of the sample in a direction specified by a given angular mode to a point on the horizontal or vertical axis comprising the reference samples r. The sample may be predicted by interpolating between the two closest reference samples in r of the projection point if the projection does not fall directly on a reference sample in r. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC).

FIG. 12 illustrates a sample in Cb predicted for a vertical prediction mode. For vertical prediction modes, the position (x, y) of the sample in Cb is projected onto the horizontal axis comprising reference samples r. Because the projection falls between two reference samples r1 and r2 in the example of FIG. 12, the predicted value of the sample in Cb may be calculated as the linear interpolation between the two reference samples r1 and r2 as $$Cb(x,y) = (1-\Delta) \cdot r1 + \Delta \cdot r2 \quad (5)$$

where $$r1 = r(x + \lfloor (y+1) \cdot \tan \varphi \rfloor, -1), \quad (6)$$

$$r2 = r(x + \lfloor (y+1) \cdot \tan \varphi \rfloor + 1, -1), \quad (7)$$

$$\Delta = ((y+1) \cdot \tan \varphi) - \lfloor (y+1) \cdot \tan \varphi \rfloor, \text{ and} \quad (8)$$

$$\lfloor \cdot \rfloor \text{ is an integer floor.} \quad (9)$$

It should be noted that the weighting factors (1−Δ) and Δ may be calculated with some predefined level of precision, such as 1/32 pixel precision. To avoid floating point operations while preserving the specified precision, the weighting factors (1−Δ) and Δ may be multiplied by the reciprocal of the specified precision used and then divided by the reciprocal using, for example, right shift operations. It should be further noted that supplementary reference samples may be constructed for the case where the position (x, y) of a sample Cb to predicted is projected to a negative x coordinate, which happens with negative angles φ. The supplementary reference samples may be constructed by projecting the reference samples in r on the vertical axis to the horizontal axis using the angle φ. Finally, it should be further noted that a sample in Cb may be predicted for a horizontal prediction mode in a similar manner as discussed above for vertical prediction modes. For horizontal prediction modes, the position (x, y) of the sample in Cb may be projected onto the vertical axis comprising reference samples r and the angle φ may be defined relative to the x-axis. Supplemental reference samples may be similarly constructed for horizontal prediction modes by projecting the reference samples in r on the horizontal axis to the vertical axis using the angle φ.

An encoder may predict the samples of a current block being encoded, such as current block 904, for a plurality of intra prediction modes as explained above. For example, the encoder may predict the samples of the current block for each of the 35 intra prediction modes in HEVC or 67 intra prediction modes in VVC. For each intra prediction mode applied, the encoder may determine a prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may select one of the intra prediction modes to encode the current block based on the determined prediction errors. For example, the encoder may select an intra prediction mode that results in the smallest prediction error for the current block. In another example, the encoder may select the intra prediction mode to encode the current block based on a rate-distortion measure determined using the prediction errors. The encoder may send an indication of the selected intra prediction mode and its corresponding prediction error to a decoder for decoding of the current block.

Although the description above was primarily made with respect to intra prediction modes in HEVC and VVC, it will be understood that the techniques of the present disclosure described above and further below may be applied to other intra prediction modes, including those of other video coding standards like VP8, VP9, AV1, and the like.

In existing technologies, an encoder may apply intra prediction to encode a current block. Using intra prediction, the encoder may predict samples of the current block using a set of reference samples and determine a residual based on sample-by-sample differences between corresponding ones of the predicted sample values and the original sample values of the current block. The residual block may be of the same or similar size as the current block. In other words, the residual block may comprise a number of sample difference values that is the same or similar to the number of samples of the current block. It can be shown that the number of sample difference values of the residual may be directly related to the number of bits needed to encode the current block. Generally, homogeneous texture or non-edge-based blocks may be chosen as larger block sizes during picture partitioning and hence, the corresponding residuals may also be larger in size. However, most of the samples in these types of block often have similar intensity values. Therefore, a larger residual may not be efficient in terms of bitstream signaling in existing technologies.

Embodiments of the present disclosure are related to a method and apparatus for decreasing the residual block size produced for a current block encoded using intra prediction. Embodiments of the present disclosure may downscale the current block to a second block with a smaller number of samples relative to the current block. Any one of a number of different downscaling techniques may be used to downscale the current block to produce the second block. A prediction of the second block may then be generated, from a set of reference samples, using an intra prediction mode. The reference samples may be determined based on the non-downscaled current block. After the prediction is generated, a residual may be determined based on sample-by-sample differences between corresponding ones of the predicted sample values and the original sample values of the second block. The residual may then be signaled in a bitstream for the current block. Because the residual is determined on the basis of the second block as opposed to the non-downscaled current block, the residual will be smaller in size than a residual produced for the non-downscaled current block and may need less bits for signaling.

Embodiments of the present disclosure may enable the method and apparatus for decreasing the residual block size based on intra prediction mode. For example, when one or more particular intra prediction modes (e.g., DC or planar) are used to perform intra prediction, these modes may indicate that the samples of the current block have similar intensity values. Because of the similarity in intensity values, downscaling may result in little or no added distortion to the reconstructed version of the current block at the encoder. In general, blocks with larger sizes that typically benefit the most from a decreased residual block size often have samples with similar intensity values.

Figure 13:
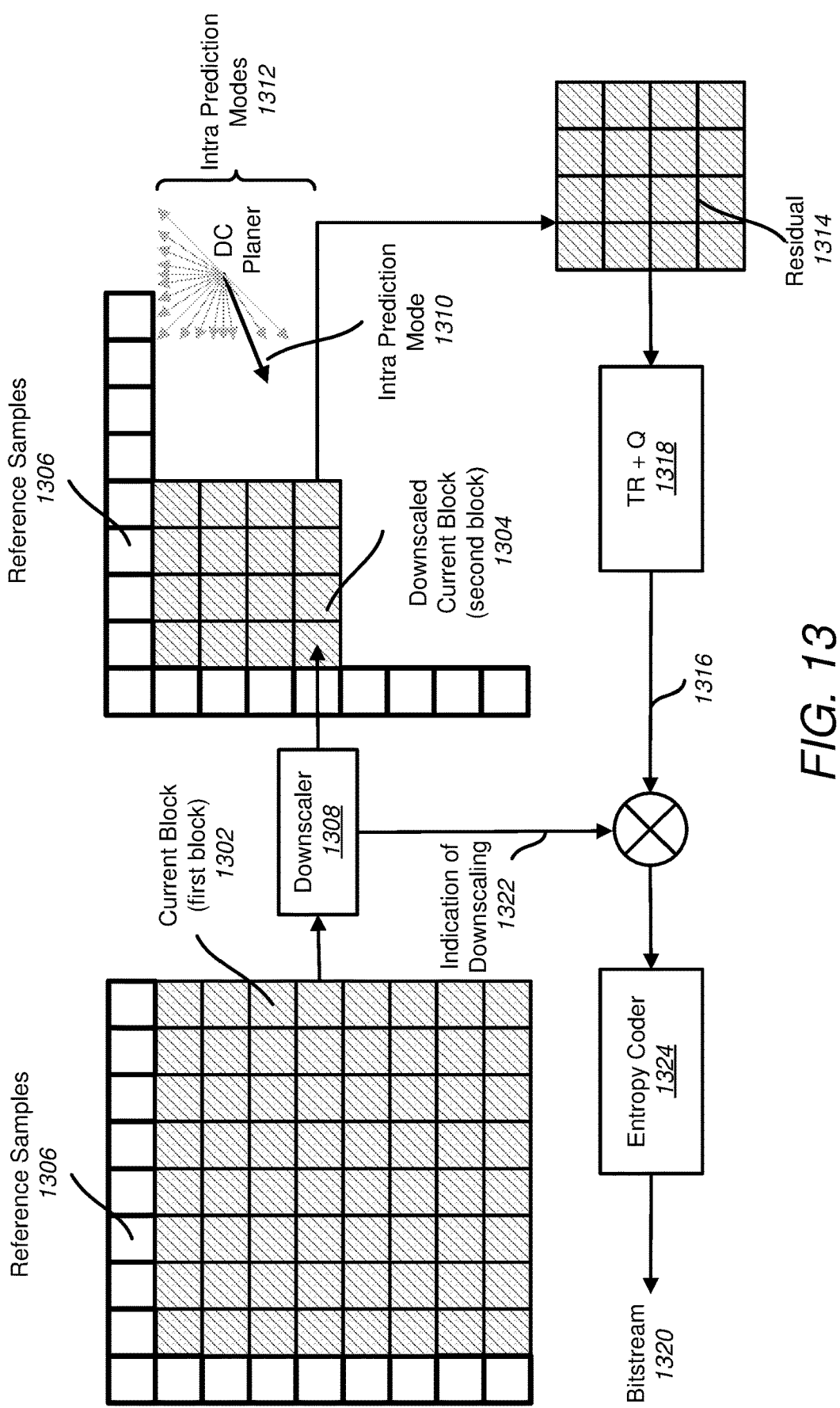
FIG. 13 illustrates an example encoding block diagram for a current block in accordance with embodiments of the present disclosure.

FIG. 13 illustrates an example of decreasing a residual block size produced for a current block encoded by an encoder using intra prediction in accordance with embodiments of the present disclosure. FIG. 13 illustrates a current block of samples (first block) 1302 being encoded, a downscaled version of the current block (second block) of samples 1304, and reference samples 1306.

The encoder may determine reference samples 1306 for intra prediction of first block of samples 1302. Given current block 1302 is of w×h samples in size, reference samples 1306 may extend over 2 w samples of the row immediately adjacent to the top-most row of current block 1302 (not shown in FIG. 13 to its full extent for ease of illustration), 2 h samples of the column immediately adjacent to the left-most column of current block 1302 (not shown in FIG. 13 to its full extent for ease of illustration), and the top left neighboring corner sample to current block 1302. In FIG. 13, current block 1302 is square, so w=h.

For constructing the set of reference samples 1306, the encoder may use available samples from neighboring blocks of current block 1302 as discussed above with respect to FIG. 9. The encoder may fill unavailable ones of reference samples 1306 with available ones of reference samples 1306. For example, the encoder may fill an unavailable reference sample with a nearest available reference sample determined by moving in a clockwise direction through reference samples 1306 from the position of the unavailable reference. If no reference samples are available, the encoder may fill reference samples 1306 with the mid-value of the dynamic range of the picture being coded. In other examples, the encoder may determine reference samples 1306 in a different manner.

The encoder may downscale current block 1302 to produce downscaled current block 1304 with a smaller number of samples relative to current block 1302. For example, the encoder may include downscaler 1308 for downscaling current block 1302 to produce downscaled current block 1304 with a smaller number of samples relative to current block 1302. The encoder may downscale current block 1302 using any one of a number of different downscaling techniques. For example, the encoder may downscale current block 1304 using a bicubic, bilinear, or average downscaling of samples of current block 1302. For reduction of computational complexity, the encoder may downscale current block 1302 by subsampling the samples of current block 1302. For example, the encoder may drop samples of current block 1302 at a determined rate (e.g., one-half, one-third, or one-quarter) in the horizontal and/or vertical direction of current block 1302.

The encoder may intra predict downscaled current block 1304 based on reference samples 1306 and an intra prediction mode 1310. The encoder may select intra prediction mode 1310, for intra prediction of downscaled current block 1304, from a plurality of intra prediction modes 1312. The plurality of intra prediction modes may depend on a video compression standard implemented by the encoder (e.g., the 35 intra prediction modes in HEVC or 67 intra prediction modes in VVC).

In one example, the encoder may select intra prediction mode 1310 by predicting downscaled current block 1304 for each of intra prediction modes 1312. For each intra prediction mode 1312, the encoder may determine a residual (or prediction error) for downscaled current block 1304 based on a difference (e.g., sum of squared differences (SSD), sum of absolute differences (SAD), or sum of absolute transformed differences (SATD)) between the prediction samples determined for the intra prediction mode and the original samples of downscaled current block 1304. The encoder may select intra prediction mode 1310 from applied intra prediction modes 1312 to encode downscaled current block 1304 based on the determined residuals. For example, the encoder may select an intra prediction mode that results in the smallest residual for downscaled current block 1304. In another example, the encoder may select intra prediction mode 1310 based on a rate-distortion measure determined using the residuals.

In another example, the encoder may select intra prediction mode 1310 by predicting current block 1302 for each of intra prediction modes 1312. For each intra prediction mode 1312, the encoder may determine a residual (or prediction error) for current block 1302 based on a difference (e.g., sum of squared differences (SSD), sum of absolute differences (SAD), or sum of absolute transformed differences (SATD)) between the prediction samples determined for the intra prediction mode and the original samples of current block 1302. The encoder may select intra prediction mode 1310 from intra prediction modes 1312 to encode downscaled current block 1304 based on the determined residuals. For example, the encoder may select an intra prediction mode that results in the smallest residual for current block 1302. In another example, the encoder may select intra prediction mode 1310 based on a rate-distortion measure determined using the residuals.

In yet another example, the encoder may select intra prediction mode 1310 by predicting current block 1302 and downscaled current block 1304 for each of intra prediction modes 1312. The residuals of the two blocks may be normalized to allow comparisons between the residuals. After normalizations, the encoder may select an intra prediction mode that results in the smallest residual among those calculated for current block 1302 and downscaled current block 1304. In another example, the encoder may select intra prediction mode 1310 based on a rate-distortion measure determined using the residuals among those calculated for current block 1302 and downscaled current block 1304.

The encoder may transform residual 1314, determined for downscaled current block 1304 based on intra prediction mode 1310, into a frequency domain signal 1316 (e.g., represented by a set of coefficients) by applying a frequency domain transform and thereafter quantize the coefficients. The encoder may include a transform and quantization unit (TR+Q) unit 1318 for transforming and quantizing residual 1314. The encoder may signal, in a bitstream 1320, an indication 1322 of the downscaling performed on current block 1302 and frequency domain signal 1316. Prior to signaling indication 1322 and frequency domain signal 1316 in bit stream 1320, the encoder may entropy code indication 1322 and frequency domain signal 1316 using entropy coder 1324. The indication of downscaling 1322 may be a single bit representing a flag. Moreover, the indication of the downscaling and the indication of the selected intra mode for the second block of samples may be jointly indicated with an intra prediction mode. For example, the indication of the downscaling may be indicated by the signaling of intra prediction mode 1310. As shown in FIG. 13, the size of residual 1314 may be the same as downscaled current block 1304, which is smaller than current block 1302.

To reduce the overhead of computational cost of intra prediction for the second block of samples 1306, the encoder may restrict intra prediction modes 1312 to Direct Current (DC) and/or Planar intra prediction modes.

In an example, to reduce the computational complexity at the encoder side, downscaled current block 1304 may be calculated based on the intra prediction modes of already encoded neighboring blocks of current block 1302 (e.g., blocks within some range or located relative to current block 1302). An example of neighboring blocks is illustrated in FIG. 9. In the example of FIG. 9, the block labeled with the number 7 may be considered current block 1302 and the blocks labeled with the numbers 0-6 may be considered the neighboring blocks of current block 1302. If a certain percentage, number, or majority of the neighboring blocks are encoded using a DC and/or planar intra prediction mode, then current block 1302 may be downscaled to produce downscaled current block 1304 and the corresponding intra prediction may be calculated. Otherwise, downscaling of current block 1302 may be skipped to reduced computation complexity.

Figure 14:
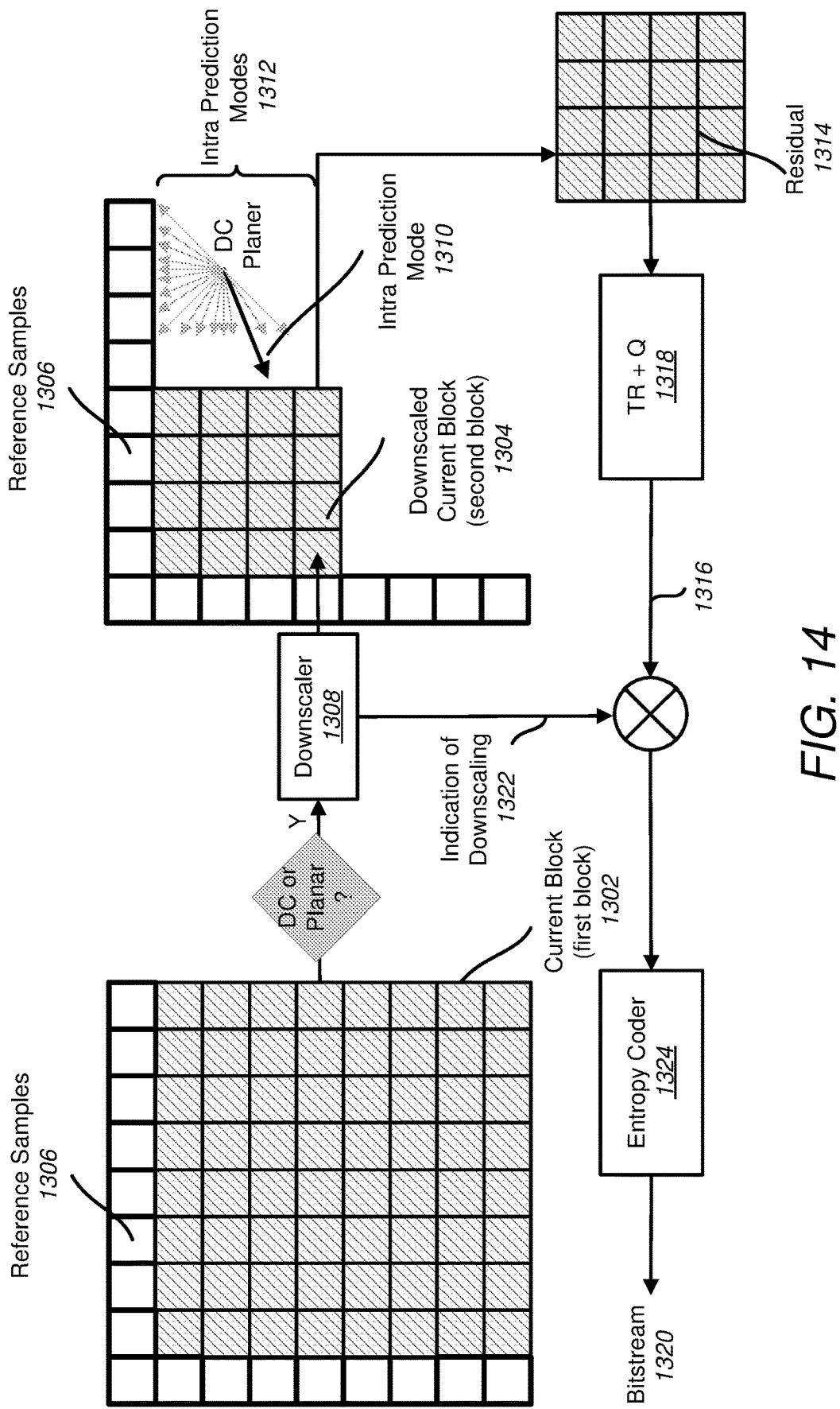
FIG. 14 illustrates an example encoding with a condition in accordance with embodiments of the present disclosure.

In an example, to reduce the computational complexity at the encoder side, the encoder may conditionally downscale current block 1302. FIG. 14 illustrates downscaling being conditionally applied to current block 1302 based on whether an intra prediction mode, selected to intra predict current block 1302, is a DC intra prediction mode, a planar intra prediction mode, or either a DC or planar intra prediction mode. An encoder may select an intra prediction mode for current block 1302 by predicting current block 1302 for each of a plurality of intra prediction modes. For each of the plurality of intra prediction mode, the encoder may determine a residual (or prediction error) for current block 1302 based on a difference (e.g., sum of squared differences (SSD), sum of absolute differences (SAD), or sum of absolute transformed differences (SATD)) between the prediction samples determined for the intra prediction mode and the original samples of current block 1302. The encoder may select the intra prediction mode from the plurality of intra prediction modes based on the determined residuals. For example, the encoder may select the intra prediction mode that results in the smallest residual for current block 1302. In another example, the encoder may select the intra prediction mode based on a rate-distortion measure determined using the residuals.

If the selected intra prediction mode for current block 1302 is a DC intra prediction mode, a planar intra prediction mode, or either a DC or planar intra prediction mode, the encoder may downscale current block 1302 and perform the remainder of the process discussed above with respect to FIG. 13. If the selected intra prediction mode for current block 1302 is not a DC intra prediction mode, a planar intra prediction mode, or either a DC or planar intra prediction mode, the encoder may not perform downscaling of current block 1302 and signal the selected intra prediction mode for current block 1302 in the bit stream in accordance with a traditional intra prediction scheme.

The signaling overhead of indication 1322 may be reduced. A decoder may have prior knowledge about the size of current block 1302. Moreover, from the bitstream, the decoder may determine the size of residual block 1314. Based on these two pieces of information, the decoder may determine that downscaling has been performed on current block 1302 at the encoder and the amount of scaling applied at the encoder.

Figure 15:
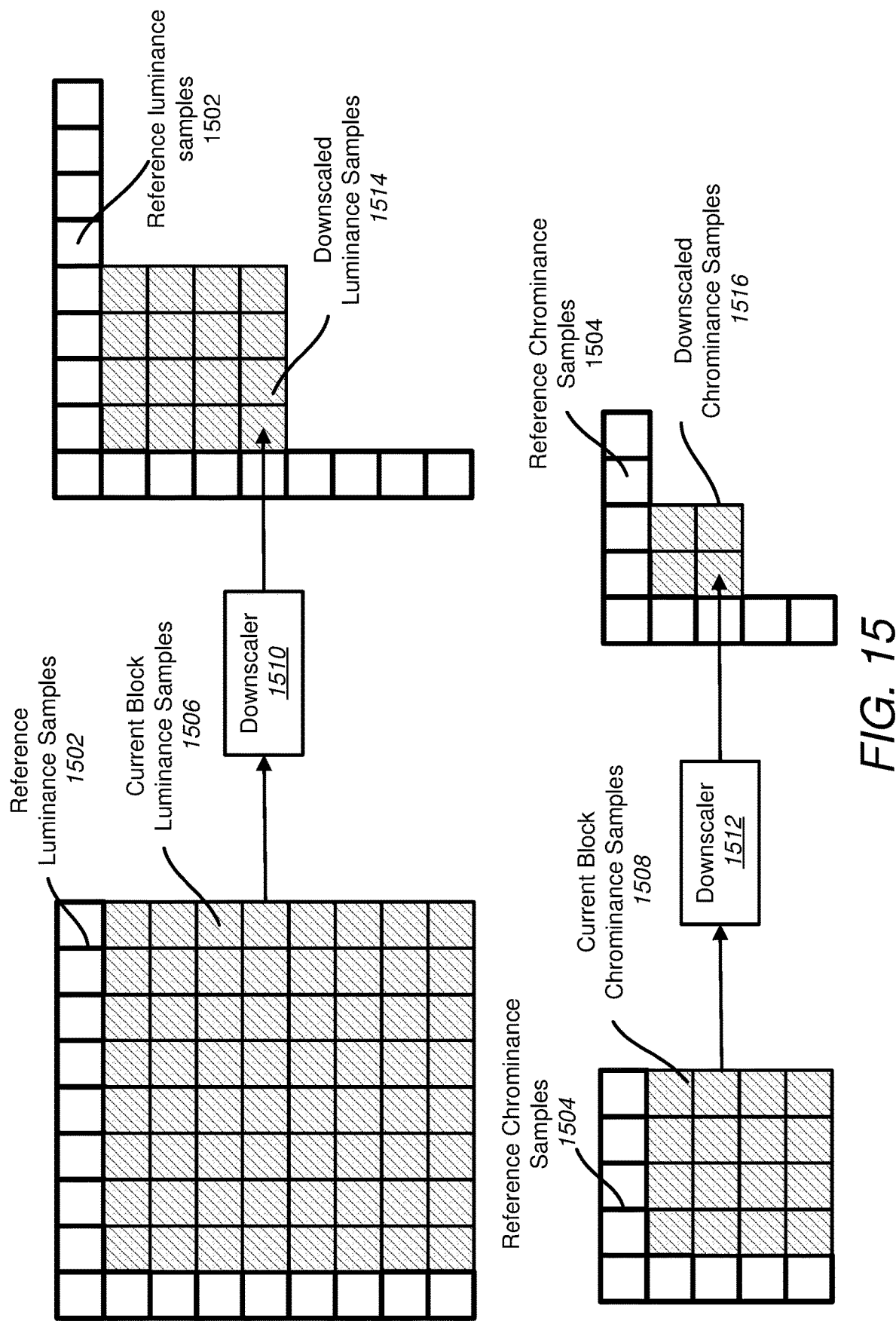
FIG. 15 illustrates luminance and chrominance sample downscaling for the current block from FIG. 13 in accordance with embodiments of the present disclosure.

Referring now to FIG. 15, current block 1302 may have luminance and chrominance components or samples. In FIG. 15, reference samples for luminance 1502 and chrominance 1504 intra prediction of current block 1302 is shown. The luminance samples 1506 of current block 1302 and chrominance sample 1508 of current block 1302 are further shown. Luminance samples 1506 and chrominance samples 1508 may be downscaled to downscaled luminance samples 1514 and downscaled chrominance samples 1516. For example, luminance samples 1506 may be downscaled to downscaled luminance samples 1514 by a downscaler 1510. Similarly, chrominance samples 1508 may be downscaled by a downscaled 1512. Downscaled luminance samples 1514 and downscaled chrominance samples 1516 may be intra predicted separately using the reference samples of luminance 1502 and chrominance 1504, respectively. Downscalars 1510 and 1512 may be different in terms of amount of downscaling they provide and the downscaling technique they apply. A downscaling indication, amount, or algorithm may be signaled in bitstream 1320. As mentioned above, the amount of downscaling may be implicitly determined (e.g., without an explicit indication in bitstream 1320) by the decoder by examining the size of luminance samples 1506 or chrominance samples 1508 and their corresponding residuals.

For further reduction of computational overhead, in the illustration FIG. 15, only one of luminance samples 1506 or chrominance samples 1508 of current block 1302 may downscaled. In such a case, the amount of downscaling for one of downscalers 1510 and 1512 may be zero.

Figure 16:
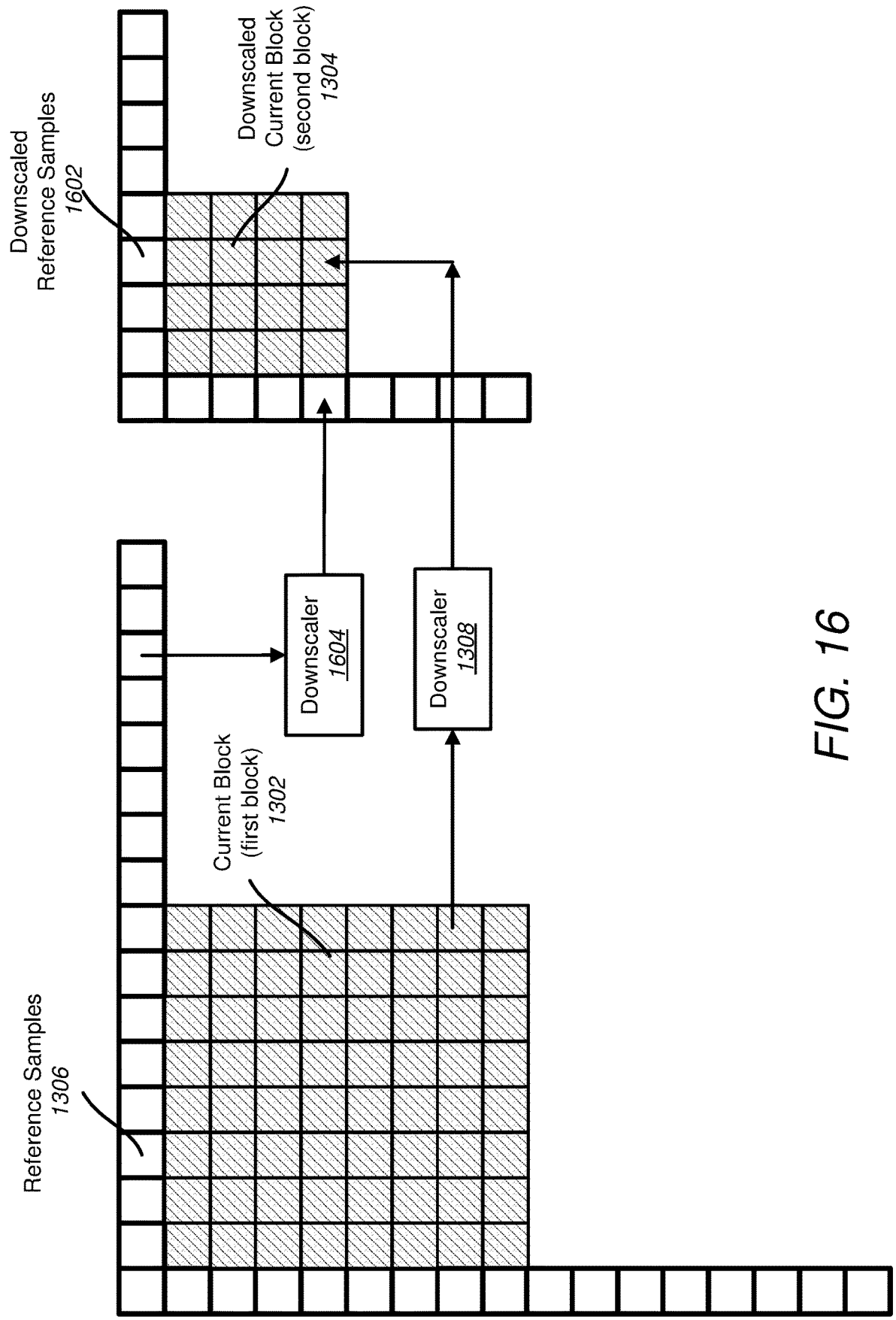
FIG. 16 illustrates downscaling of the current block and the reference samples from FIG. 13 in accordance with embodiments of the present disclosure.

The encoder may downscale the reference samples as illustrated in FIG. 16. In FIG. 16, reference samples 1306 are downscaled to provide downscaled reference sample 1602. For example, reference samples 1306 may be downscaled by a down scalar 1604, whereas the current block 1302 is downscaled to downscaled current block 1304 by down scalar 1308. This example may be suitable for angular intra prediction. For DC and/or planar intra prediction modes, downscaled reference samples 1602 generation may be restricted. The encoder may determine the intra prediction modes of downscaled current block 1304 from a plurality of intra prediction modes, as explained above with respect to FIG. 13, but using downscaled reference samples 1602.

The indication of downscaling of the reference samples may be signaled in bitstream 1320. The scaling parameters (e.g. scaling amount, algorithm) for downscaler 1604 may be different than those of downscaler 1308. In this scenario, the encoder may signal the scaling parameters of the 1604 along with the indication of downscaling of reference samples in bitstream 1320.

In an example embodiment, an encoder may determine reference samples for intra prediction of a first block of samples. In an example, the intra prediction mode may be a Direct Current (DC) intra prediction mode or a planar intra prediction mode.

The encoder may downscale the first block of samples to a second block of samples. In an example, the downscaling may comprise downscaling the first block of samples to the second block of samples based on the intra prediction mode being a DC intra prediction mode or a planar intra prediction mode. In an example, the indication of the downscaling may be a single bit. In an example, the indication of the downscaling may be indicated by the signaling of the intra prediction mode. In an example, the indication of the downscaling may be implicitly signaled in the bit stream based on the residual being for a smaller number of samples in the second block of samples than in the first block of samples. In an example, the downscaling may comprise subsampling the samples of the first block. In an example, the downscaling may comprise one of bicubic, bilinear, or average down sampling of samples of the first block. In an example, the downscaling the first block may comprise downscaling luminance and chrominance samples of the first block of samples. In an example, the downscaling the first block may comprise downscaling only one of luminance or chrominance samples of the first block of samples. In an example, the downscaling further may comprise downscaling the first block of samples to the second block of samples based on a number of spatially neighboring encoded blocks of the first or the second block being intra predicted as DC or planar mode. In an example, the encoder may downscale the reference samples, of the first block of samples, to generate second reference samples, wherein the generating the prediction of the second block of samples may be based on the second reference samples. In an example, the downscaling of the reference samples may be the same as the downscaling the first block of samples.

The encoder may generate for an intra prediction mode, a prediction of the second block of samples from the reference samples. In an example, the encoder may generate for each of a plurality of intra prediction modes, a prediction of the first block of samples from the reference samples.

The encoder may calculate a residual for the second block of samples based on the prediction of the second block of samples, and the second block of samples.

The encoder may signal in a bit stream for the first block of samples, the residual, and an indication of the downscaling. In an example, the signaling may comprise signaling, in the bit stream for the first block of samples, the intra prediction mode. In an example, the indication of the downscaling may comprise an amount of downscaling of the first block of sample. In an example, the indication of the downscaling may comprise an amount of downscaling of luminance and chrominance samples of the first block. In an example, the encoder may signal in the bit stream, an indication of the downscaling of the reference samples.

The encoder may select based on the predictions of the first block of samples, the intra prediction mode from the plurality of intra prediction modes for the intra prediction of the first block of samples. In an example, the selecting may be based on a rate distortion optimization calculation. In an example, the encoder may select the intra prediction mode, which may comprise selecting the intra prediction mode, from the plurality of intra prediction modes, that results in a smallest residual for the first block of samples.

Figure 17:
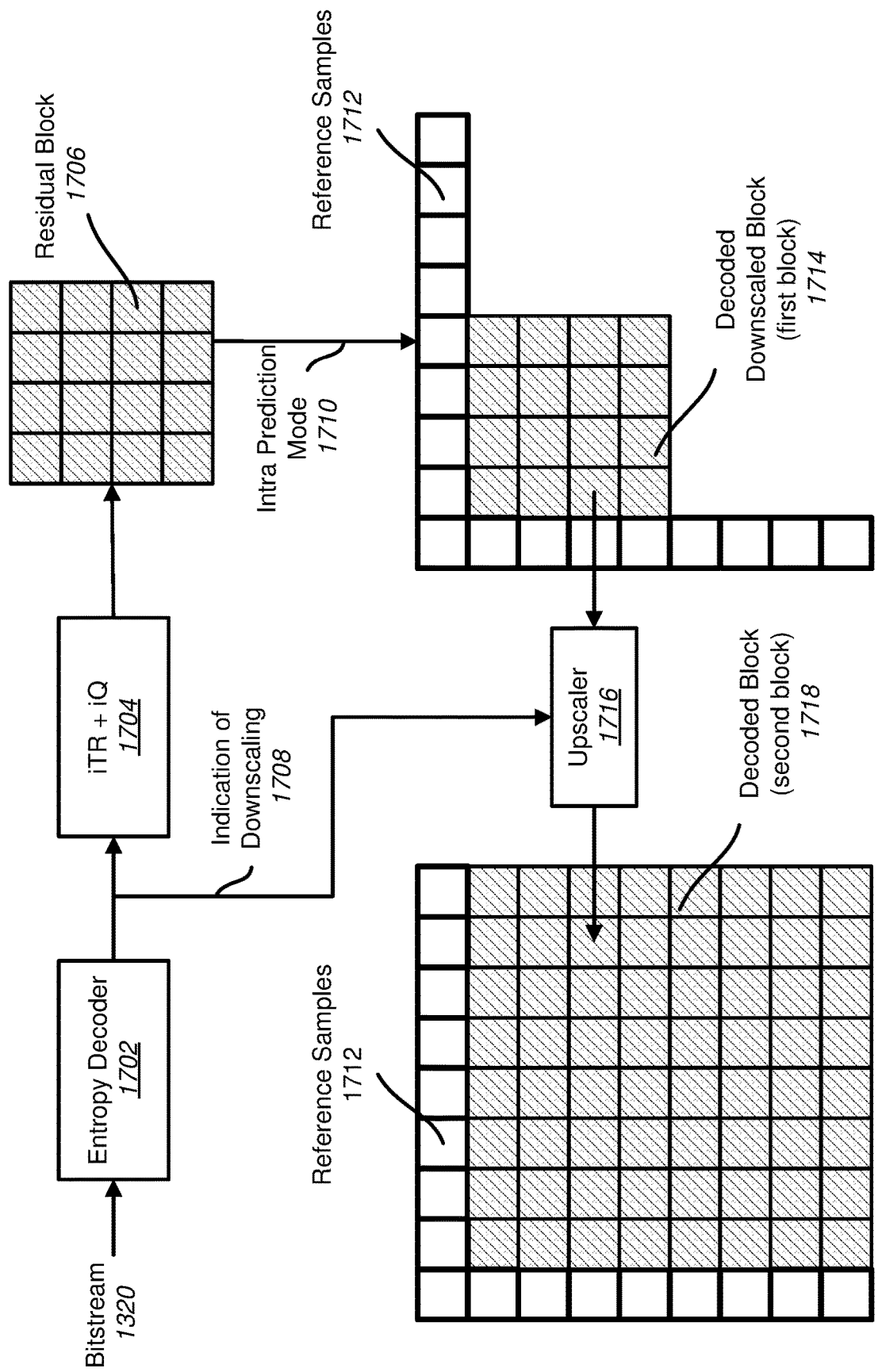
FIG. 17 illustrates an example decoding block diagram for a current block in accordance with embodiments of the present disclosure.

FIG. 17 illustrates an example of decoding current block 1302 from bitstream 1320. FIG. 17 illustrates an entropy decoder 1702, inverse transform-quantizer (iTR+iQ) 1704, and a decoded residual block 1706 corresponding to residual 1314. The input bitstream 1320 is decoded by entropy decoder 1702 and the output of entropy decoder 1702 is provided to iTR+iQ 1704. From iTR+iQ 1704, residual block of samples 1706 and intra prediction mode 1710 is recovered from bitstream 1320. Entropy decoder 1702 may further provide from bit stream 1320 an indication of downscaling 1708. Indication of downscaling 1708 may be provided to an upscaler 1716 for applying an amount of upscaling and an upscaling technique either implicitly or explicitly indicated by indication of downscaling 1708.

FIG. 17 further illustrates a set of decoded downscaled block of samples 1714, decoded block of samples (second block) 1718, and reference samples 1712. Form residual block of samples 1706, reference samples 1712, and intra prediction mode 1710, the decoded block of samples 1718 may be determined. The decoded downscaled block of samples 1714 is up scaled to the decoded block of samples 1718 by the upscaler 1716. FIG. 17 illustrates that the size of decoded downscaled block of samples 1714 may be the same as residual block of samples 1706 and these sizes may be smaller than the decoded block of samples 1718. Intra prediction mode 1710 may be Direct Current (DC) and/or Planar intra prediction mode only.

In the above example of FIG. 17, the decoder may receive an indication of no scaling and decoding of an intra prediction block may take place according to one or more traditional approaches.

Indication of downscaling 1708 may be a single bit. Moreover, the indication of downscaling 1708 and the indication of the intra mode for the decoded first block of samples may be jointly indicated with an intra prediction mode.

The signaling overhead of downscaling 1708 may be further be reduced. A decoder may have prior knowledge about the size of current block 1302. Moreover, from bitstream 1320, the decoder may calculate the size of residual block 1706. From these two pieces of information, the decoder may determine an amount of downscaling applied to current block 1302 during the encoding process without receiving an explicit indication of such from the encoder in bitstream 1320.

In an example embodiment, a decoder may receive in a bit stream and for a block of samples, a residual, and an indication of a downscaling. In an example, the decode may receive in the bit stream and for a second block of samples, a second residual and an indication of no scaling.

The decoder may determine reference samples for intra prediction of the block of samples. In an example, the intra prediction mode may be a DC intra prediction mode or a planar intra prediction mode. In an example, the decoder may determine reference samples for intra prediction of the second block of samples.

The decoder may generate for an intra prediction mode, a prediction of the block of samples from the reference samples. The decode may generate a first decoded block of samples based on the prediction of the block of samples, and the residual. In an example, the decoder may generate for a second intra prediction mode, a prediction of the second block of samples from the reference samples. In an example, the decoder may generate a second reference samples, downscaling the reference samples of the first block of samples, based on the indication. In an example, the decoder may generate for an intra prediction mode, a prediction of the block of samples from the second reference samples.

The decoder may decode the second block of samples based on the prediction of the second block of samples, and the second residual. In an example, the decoding may comprise decoding, of the intra prediction mode, from the first block of samples in the bitstream.

The decoder may upscale the first decoded block of samples to a second decoded block of samples, based on the indication of the downscaling. In an example the indication of the downscaling may be a single bit. In an example, the indication of the downscaling may be indicated by the intra prediction mode. In an example, the indication of the up scaling may be implicitly received from the bit stream based on the residual being for a smaller number of samples in the second block of samples than in the first block of samples. In an example, the up scaling may comprise one of bicubic, bilinear, or average up sampling of samples of the first block. In an example, the upscaling the first block may comprise upscaling luminance and chrominance samples of the first block of samples. In an example, the upscaling the first block may comprise upscaling only one of luminance or chrominance samples of the first block of samples. In an example, the indication of the up scaling may comprise an amount of up scaling of the first block of sample. In an example, the indication of the up scaling may comprise an amount of up scaling of luminance and chrominance samples of the first block. In an example, the decoder may comprise the indication of downscaling of the reference samples, of the first block of samples. In an example, the upscaling of the reference samples may be the same as the upscaling the first block of samples.

Figure 18:
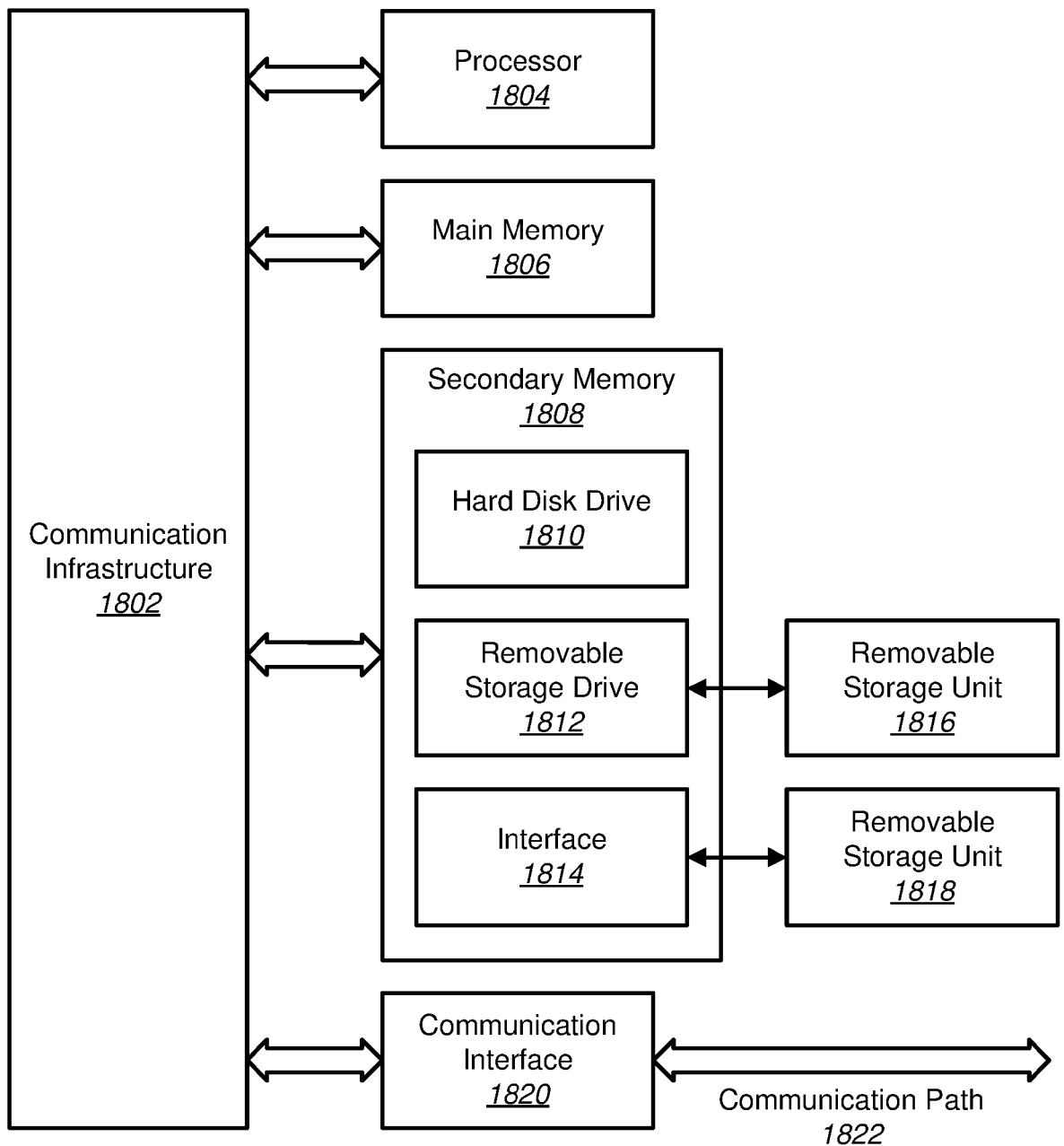
FIG. 18 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 1800 is shown in FIG. 18. Blocks depicted in the figures above, such as the blocks in FIGS. 1, 2, and 3, may execute on one or more computer systems 1800. Furthermore, each of the steps of the flowcharts depicted in this disclosure may be implemented on one or more computer systems 1800.

Computer system 1800 includes one or more processors, such as processor 1804. Processor 1804 may be, for example, a special purpose processor, general purpose processor, microprocessor, or digital signal processor. Processor 1804 may be connected to a communication infrastructure 902 (for example, a bus or network). Computer system 1800 may also include a main memory 1806, such as random access memory (RAM), and may also include a secondary memory 1808.

Secondary memory 1808 may include, for example, a hard disk drive 1810 and/or a removable storage drive 1812, representing a magnetic tape drive, an optical disk drive, or the like. Removable storage drive 1812 may read from and/or write to a removable storage unit 1816 in a well-known manner. Removable storage unit 1816 represents a magnetic tape, optical disk, or the like, which is read by and written to by removable storage drive 1812. As will be appreciated by persons skilled in the relevant art(s), removable storage unit 1816 includes a computer usable storage medium having stored therein computer software and/or data.

In alternative implementations, secondary memory 1808 may include other similar means for allowing computer programs or other instructions to be loaded into computer system 1800. Such means may include, for example, a removable storage unit 1818 and an interface 1814. Examples of such means may include a program cartridge and cartridge interface (such as that found in video game devices), a removable memory chip (such as an EPROM or PROM) and associated socket, a thumb drive and USB port, and other removable storage units 1818 and interfaces 1814 which allow software and data to be transferred from removable storage unit 1818 to computer system 1800.

Computer system 1800 may also include a communications interface 1820. Communications interface 1820 allows software and data to be transferred between computer system 1800 and external devices. Examples of communications interface 1820 may include a modem, a network interface (such as an Ethernet card), a communications port, etc. Software and data transferred via communications interface 1820 are in the form of signals which may be electronic, electromagnetic, optical, or other signals capable of being received by communications interface 1820. These signals are provided to communications interface 1820 via a communications path 1822. Communications path 1822 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 1816 and 1818 or a hard disk installed in hard disk drive 1810. These computer program products are means for providing software to computer system 1800. Computer programs (also called computer control logic) may be stored in main memory 1806 and/or secondary memory 1808. Computer programs may also be received via communications interface 1820. Such computer programs, when executed, enable the computer system 1800 to implement the present disclosure as discussed herein. In particular, the computer programs, when executed, enable processor 1804 to implement the processes of the present disclosure, such as any of the methods described herein. Accordingly, such computer programs represent controllers of the computer system 1800.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

What is claimed is:

1. A method comprising:
receiving, in a bitstream, a residual block for a first block of samples to be decoded;
implicitly receiving, from the bitstream and for the first block of samples, an indication of a downscaling based on a size of the block of residuals being smaller than a size of the first block of samples to be decoded;
determining, for intra prediction of the first block of samples, reference samples of the first block of samples;
generating, for an intra prediction mode and using the reference samples, a prediction of a second block of samples corresponding to the first block of samples being downscaled;
decoding the second block of samples based on:
the prediction of the second block of samples; and
the residual block; and
based on the indication of the downscaling, upscaling the decoded second block of samples to decode the first block of samples.

2. The method of claim 1, wherein the intra prediction mode is a Direct Current (DC) intra prediction mode or a planar intra prediction mode.

3. The method of claim 1, further comprising:
receiving, in the bitstream and for a third block of samples, a second residual block;
determining, from the bitstream and for the third block of samples, an indication of no scaling;
determining, for intra prediction of the third block of samples, reference samples of the third block of samples;
generating, for a second intra prediction mode, a prediction of the third block of samples from the reference samples of the third block of samples; and
decoding the third block of samples based on:
the prediction of the third block of samples; and
the second residual block.

4. The method of claim 1, wherein the indication of the downscaling is determined based on the intra prediction mode indicated in the bitstream for the first block of samples.

5. The method of claim 1, wherein the upscaling comprises one of bicubic, bilinear, or average upsampling of samples of the decoded second block.

6. The method of claim 1,
wherein the generating the prediction of the second block of samples using the reference samples comprises:
based on the indication of downscaling of the reference samples, generating second reference samples by downscaling the reference samples of the first block of samples; and
generating the prediction of the second block of samples from the second reference samples.

7. The method of claim 6, wherein an amount of the downscaling of the reference samples is determined based on an amount of the upscaling the second block of samples.

8. A decoder comprising:
one or more processors; and
memory storing instructions that, when executed by the one or more processors, cause the decoder to:
receive, in a bitstream, a residual block for a first block of samples to be decoded;
implicitly receive, from the bitstream and for the first block of samples, an indication of a downscaling based on a size of the block of residuals being smaller than a size of the first block of samples to be decoded;
determine, for intra prediction of the first block of samples, reference samples of the first block of samples;
generate, for an intra prediction mode and using the reference samples, a prediction of a second block of samples corresponding to the first block of samples being downscaled;
decode the second block of samples based on:
the prediction of the second block of samples; and
the residual block; and
based on the indication of the downscaling, upscale the decoded second block of samples to decode the first block of samples.

9. The decoder of claim 8, wherein the intra prediction mode is a Direct Current (DC) intra prediction mode or a planar intra prediction mode.

10. The decoder of claim 8, wherein the instructions, when executed by the one or more processors, further cause the decoder to:
receive, in the bitstream and for a third block of samples, a second residual block;
determine, from the bitstream and for the third block of samples, an indication of no scaling;
determine, for intra prediction of the third block of samples, reference samples of the third block of samples;
generate, for a second intra prediction mode, a prediction of the third block of samples from the reference samples of the third block of samples; and
decode the third block of samples based on:
the prediction of the third block of samples; and
the second residual block.

11. The decoder of claim 8, wherein the indication of the downscaling is determined based on the intra prediction mode indicated in the bitstream for the first block of samples.

12. The decoder of claim 8, wherein the decoded second block of samples is upscaled using one of bicubic, bilinear, or average upsampling of samples of the decoded second block.

13. The decoder of claim 8,
wherein to generate the prediction of the second block of samples using the reference samples, the decoder is further caused to:
based on the indication of downscaling of the reference samples, generate second reference samples by downscaling the reference samples of the first block of samples; and
generate the prediction of the second block of samples from the second reference samples.

14. The decoder of claim 13, wherein the reference samples are downscaled by an amount determined based on an amount the second block of samples are upscaled.

15. The method of claim 1, wherein an amount of the upscaling is determined based on the size of the block of residuals and the size of the first block of samples to be decoded.

16. The decoder of claim 8, wherein an amount to upscale the decoded second block of samples is based on the size of the block of residuals and the size of the first block of samples to be decoded.

17. A non-transitory computer-readable medium comprising instructions that, when executed by one or more processors, cause the one or more processors to:
- receive, in a bitstream, a residual block for a first block of samples to be decoded;
- implicitly receive, from the bitstream and for the first block of samples, an indication of a downscaling based on a size of the block of residuals being smaller than a size of the first block of samples to be decoded;
- determine, for intra prediction of the first block of samples, reference samples of the first block of samples;
- generate, for an intra prediction mode and using the reference samples, a prediction of a second block of samples corresponding to the first block of samples being downscaled;
- decode the second block of samples based on:
  - the prediction of the second block of samples; and
  - the residual block; and
- based on the indication of the downscaling, upscale the decoded second block of samples to decode the first block of samples.

18. The non-transitory computer-readable medium of claim 17, wherein the intra prediction mode is a Direct Current (DC) intra prediction mode or a planar intra prediction mode.

19. The non-transitory computer-readable medium of claim 17, wherein to generate the prediction of the second block of samples using the reference samples, the one or more processors are further caused to:
- based on the indication of downscaling of the reference samples, generate second reference samples by downscaling the reference samples of the first block of samples; and
- generate the prediction of the second block of samples from the second reference samples.

20. The non-transitory computer-readable medium of claim 17, wherein an amount to upscale the decoded second block of samples is based on the size of the block of residuals and the size of the first block of samples to be decoded.

\* \* \* \* \*